Reissued Sept. 22, 1931 Re. 18,200

UNITED STATES PATENT OFFICE

GUSTAF HAGLUND, OF STOCKHOLM, SWEDEN, ASSIGNOR TO PATENTAKTIEBOLAGET GRÖNDAL-RAMÉN, OF STOCKHOLM, SWEDEN, A LIMITED COMPANY

CELLULOSE COOKING

No Drawing. Original No. 1,791,476, dated February 3, 1931, Serial No. 432,564, filed March 1, 1930, and in Sweden April 10, 1929. Application for reissue filed June 6, 1931. Serial No. 542,688.

In the cooking of cellulose it has been suggested to add waste liquor from a prior cooking operation to the fresh cooking liquor to be used, for the purpose of obtaining a resultant waste liquor containing a high concentration of organic matter. Likewise, instead of utilizing waste liquor from a prior cooking operation, the waste liquor from a cooking apparatus in operation may be employed.

Where resort is had to the use of waste liquor in such a manner however, undesirable effects occur in the cooking as compared with the ordinary use of a water solution of the cooking medium, without the addition of waste liquor. When waste liquor is employed as noted, the cooking process proceeds more slowly, and the product readily tends to assume a dark color and also to become weakened as a result of the extension of the cooking period.

The present invention has for its object to overcome these disadvantages whether the fresh cooking liquor is mixed with cooking liquor from previous cookings or with liquor from a cooking operation in action. According to my invention, prior to the cooking operation the raw material, for example wood chips, is first caused to absorb the fresh cooking liquor prepared in the usual manner with water, and thereafter waste liquor is added, obtained either from a prior cooking operation, or from a cooking apparatus the contents of which are in the process of cooking.

An illustrative procedure for carrying out the process of my invention is as follows: A fresh cooking liquor, which has not previously been used for cooking and which may or may not contain gases, is fed into a cooking apparatus containing the wooden chips or other raw material. The remaining unabsorbed liquor may then be withdrawn to the extent necessary to accommodate the cooking liquor to be subsequently added. Thereafter the apparatus is filled with a cooking liquor consisting of a mixture of the same fresh liquor as that which has been absorbed and a waste liquor from a previous or concurrent pulp cooking operation. The cooking operation in the apparatus thus charged is thereupon begun and proceeded with to the degree desired.

This preliminary soaking will not occasion any loss of time as compared with the usual operation, because under all circumstances the chips require time for the absorption of the cooking liquor. The process requires however, an increased pumping action, and, for effecting a rapid penetration of the unmixed cooking liquor into the chips, the cooking apparatus is preferably completely filled with the fresh liquor in the preliminary step. The pumping means are so arranged that the liquor is introduced into the cooking apparatus under pressure in order to facilitate the saturation of the chips and thereby shorten the time for the absorption.

This saturation of the chips with the fresh cooking liquor prior to the cooking operation, may of course, be conducted outside of the cooking vessel or apparatus which is to be used, and the saturated chips thereafter transferred to said apparatus, the apparatus filled with fresh cooking liquor mixed with waste liquor from the sources noted, and the cooking operation proceeded with.

The impregnation of the chips with the fresh cooking liquor before the cooking process proper, as noted, is desirable in each cooking of cellulose and should be brought about as substantially and rapidly as possible, for which purpose the use of pressure in the preliminary soaking is highly desirable in cooking operations conducted as at present. This preliminary soaking of the chips with fresh cooking liquor before the cooking operation and the subsequent cooking with a mixed cooking liquor as described, is of like advantage in other processes of cellulose cooking, for instance in alkaline cooking operations, although the beneficial effect is less marked than in the production of sulphite cellulose.

Having now particularly described the nature of my invention and the manner of its operation, what I claim is:

1. In the cooking of cellulose, for example sulphite cellulose, the improved process of producing waste liquor containing a high percentage of organic matter which comprises, impregnating the raw material, for example wood chips, with a cooking liquor produced in the usual manner without the addition thereto of waste liquor, and then conducting the cooking operation in the presence of waste liquor.

2. A process as defined in claim 1 characterized in that the preliminary impregnation of the raw material with the usual cooking liquor is carried out under pressure for the purpose of facilitating the impregnation.

3. In the cooking of cellulose, for example sulphite cellulose, the improved process of producing waste liquor containing a high percentage of organic matter which comprises, soaking the raw material, for example wood chips, in a cooking liquor produced in the usual manner without the addition thereto of waste liquor, removing part of the cooking liquor in which the raw material has been soaked, and then conducting the cooking operation with the usual cooking liquor mixed with waste liquor from a previous cooking or from a cooking apparatus in operation.

4. A process as defined in claim 3 characterized in that the preliminary soaking of the raw material with the usual cooking liquor is carried out under pressure for the purpose of facilitating the soaking.

In testimony whereof I affix my signature.

GUSTAF HAGLUND.